UNITED STATES PATENT OFFICE.

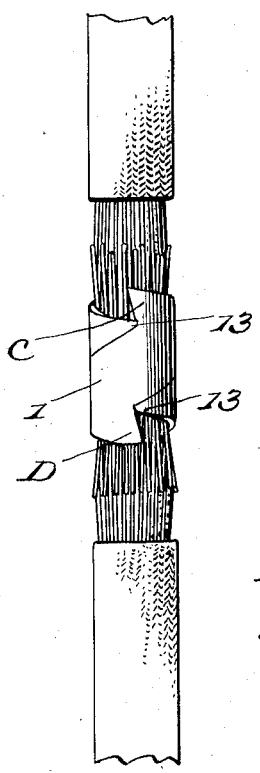
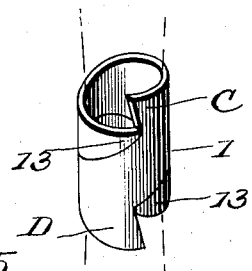
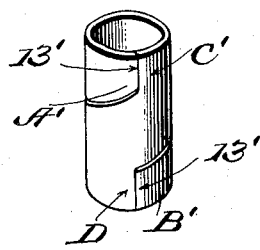
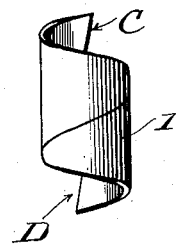
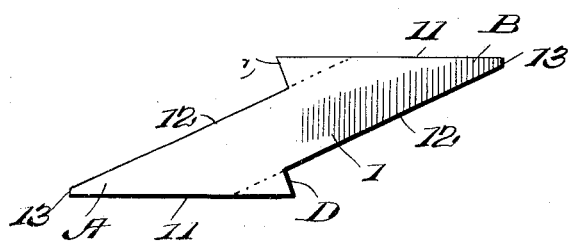

CHARLES VIGNOS, OF CANTON, OHIO, ASSIGNOR TO THE AMERICAN MINE DOOR COMPANY.

CABLE-SPLICE.

1,387,334.    Specification of Letters Patent.    Patented Aug. 9, 1921.

Application filed February 3, 1920. Serial No. 356,067.

*To all whom it may concern:*

Be it known that I, CHARLES VIGNOS, citizen of the United States, residing at Canton, in the county of Stark and State of Ohio, have invented certain new and useful Improvements in Cable-Splices, of which the following is a specification.

This invention relates to a cable splice especially adapted for connecting cables or the like; and more particularly for joining and reinforcing spliced cable ends.

The usual splicing member is so formed as to be applicable to any size cable regardless of the size of the splicing device in that it wraps about the cable by being rolled upon itself edgewise. The result is, in practice, that workmen may sometimes select a splicing device which is too small for use on the cable being spliced, thus forming a juncture which does not allow a sufficient factor of safety in use.

Therefore, the paramount object of this present invention is to provide an improved cable splicing member so formed as to include means indicating to the workman that a proper sized splicing member has been applied, and to this end the encircling splicing member is provided with coacting points and shoulder abutments, the former of which seat against the latter when the splicing member has been finally compressed around the cable.

The invention has as a still further object to provide a splice having gripping spurs so related that when bent around the overlapped cable ends they form a continuous sleeve encircling the cable and act to firmly unite the ends thereof.

The invention further contemplates the provision of a splicing member which is constituted of a single metallic piece blanked from sheet metal for wrapping around a spliced cable to produce a smooth joint which will not interfere with the cable being wound upon a suitable spool.

In the drawings:

Figure 1 is a view in elevation of the splicing member as applied to spliced cable ends, Fig. 2 is a perspective view showing the splicing member compressed but without the cable ends in position, Fig. 3 is a view similar to Fig. 2 but taken from a diametrically opposite point, Fig. 4 is a plan view of the blank from which the splicing member is formed, Fig. 5 is a perspective view, similar to Fig. 2, of a slightly different form of splice.

In detail:

The splicing member is blanked from sheet metal having the proper qualities for bending and compression, and consists of the parallel edges 11—11 with obliquely directed side edges 12 ending in edges 13—13 at right angles to the edges 11—11 to thereby form reversely directed spurs A and B; while edges 11—11 also end in abutments C and D at right angles to the said edges 12—12. The splice body thus formed is adapted to be rolled edgewise upon itself in the manner indicated in Figs. 1 to 3 inclusive to form a splicing collar embracing the cable ends.

In applying the splicing member, it is first rolled substantially to form but slightly expanded. The partially rolled splicing member is then placed on one end of the parted cable and the parted ends are joined by interlacing the strands of the cable after which the slightly expanded sleeve member or splice member is moved to encircle the splice and is then compressed to the condition shown in Figs. 1 to 3 so that the spurs A and B, mating with the respective parallel edges 12, ride upon said edges until reaching the contracted position at which time the spurs A and B abut the shoulders D and C respectively to form a cylindrical sleeve tightly binding the overlapping cable ends, the said spurs encircling the major portion of the circumference of the splice.

The joint thus formed is of such a nature as to provide a secure gripping action but also one which will not prevent the cable length being wound upon a spool.

In the modification shown in Fig. 5, the edges 13' are equivalent in dimension to the abutments C' D' so that when the spurs A' B' are compressed to position an exact cylindrical sleeve is formed. This construction is a modification of the previously described construction only in that the angle of convergence between the sides 11 and 12 of the previously described splicing blank is more gradual than shown in Fig. 4.

I claim:

1. A cable splice comprising a metallic blank having substantially parallel edges offset with respect to a central transverse axis and opposite substantially parallel edges at an oblique angle thereto, said last named edges being provided with stop shoulders at the ends nearest the transverse axis.

2. A cable splice comprising a flexible metallic strip, said strip being provided at each end with a single longitudinally disposed tongue, one tongue being arranged at one side of the strip and the second tongue being arranged at the opposite side of the strip whereby said tongues are transversely offset one with respect to the other, each end of the strip at the side of the tongue providing a transversely extended shoulder, the outer end of each of the tongues terminating in an edge affording a blunt end adapted to contact with the shoulder at the opposite end of the strip.

3. A cable splice comprising a flexible metallic strip provided at each end with a single longitudinally disposed tongue, one tongue being arranged at one side of the strip and the second tongue being arranged at the opposite side of the strip, the inner longitudinal edge of each of the tongues being inclined inwardly and in a direction away from the tongue, the end of the strip at the side of the tongue providing a transversely extended shoulder, the outer end of each of the tongues terminating in an edge affording a blunt end adapted to contact with the shoulder at the opposite end of the strip, said tongues being substantially in duplicate.

In testimony whereof I affix my signature in presence of two witnesses.

CHARLES VIGNOS. [L. S.]

Witnesses:
  N. K. BOWMAN,
  CLARA GORGAS.